United States Patent
Gregg et al.

(10) Patent No.: US 12,298,555 B2
(45) Date of Patent: May 13, 2025

(54) PUMP-SIGNAL COMBINER

(71) Applicant: Lumentum Operations LLC, San Jose, CA (US)

(72) Inventors: Patrick Gregg, Sunnyvale, CA (US); Richard D. Faulhaber, San Carlos, CA (US); Martin H. Muendel, Oakland, CA (US); Jeff Gregg, San Jose, CA (US); Kyle R. Schneider, Milpitas, CA (US)

(73) Assignee: Lumentum Operations LLC, San Jose, CA (US)

( * ) Notice: Subject to any disclaimer, the term of this patent is extended or adjusted under 35 U.S.C. 154(b) by 202 days.

(21) Appl. No.: 17/810,087

(22) Filed: Jun. 30, 2022

(65) Prior Publication Data

US 2023/0333315 A1    Oct. 19, 2023

Related U.S. Application Data

(60) Provisional application No. 63/363,219, filed on Apr. 19, 2022.

(51) Int. Cl.
  *G02B 6/02*  (2006.01)
  *G02B 6/04*  (2006.01)
  *G02B 6/28*  (2006.01)
  *H01S 3/094*  (2006.01)

(52) U.S. Cl.
  CPC ............ *G02B 6/04* (2013.01); *G02B 6/02* (2013.01); *G02B 6/2835* (2013.01); *G02B 6/2856* (2013.01); *H01S 3/094003* (2013.01); *H01S 3/094042* (2013.01); *H01S 3/094053* (2013.01)

(58) Field of Classification Search
  CPC .......... G02B 6/02; G02B 6/04; G02B 6/2835; G02B 6/2856; H01S 3/094003; H01S 3/094042; H01S 3/094053
  See application file for complete search history.

(56) References Cited

U.S. PATENT DOCUMENTS

| | | | |
|---|---|---|---|
| 5,175,782 A * | 12/1992 | Bowen | G02B 6/2856 385/51 |
| 7,272,956 B1 | 9/2007 | Anikitchev et al. | |
| 8,787,716 B2 * | 7/2014 | Kumkar | G02B 6/2856 385/15 |

(Continued)

OTHER PUBLICATIONS

Pavel Koška, Yauhen Baravets, Pavel Peterka, Jan Bohata, and Michael Písařík, "Mode-field adapter for tapered-fiber-bundle signal and pump combiners," Appl. Opt. 54, 751-756 (2015) (Year: 2015).*

*Primary Examiner* — Ryan A Lepisto
(74) *Attorney, Agent, or Firm* — Harrity & Harrity, LLP

(57) ABSTRACT

A laser component includes a pump-signal combiner, which includes a first capillary, a plurality of pump fibers, a second capillary, and a signal fiber. The plurality of pump fibers, the second capillary, and the signal fiber are arranged in a bundle configuration. The bundle configuration is disposed within an internal portion of the first capillary. A cross-section of the bundle configuration includes an outer area, in which the plurality of pump fibers are disposed, and an inner area, in which the second capillary and the signal fiber are disposed. The signal fiber is disposed within an internal portion of the second capillary.

20 Claims, 8 Drawing Sheets

(56) References Cited

U.S. PATENT DOCUMENTS

| | | | |
|---|---|---|---|
| 8,837,885 B2* | 9/2014 | Seo | G02B 6/29317 |
| | | | 372/71 |
| 8,903,211 B2* | 12/2014 | Fini | G02B 6/2856 |
| | | | 359/341.32 |
| 9,692,201 B2* | 6/2017 | Watanabe | G02B 6/2856 |
| 11,592,620 B1* | 2/2023 | Hsia | G02B 6/2835 |
| 2008/0170823 A1* | 7/2008 | Gonthier | G02B 6/2804 |
| | | | 385/43 |
| 2008/0209952 A1* | 9/2008 | Tremblay | G02B 6/2551 |
| | | | 65/402 |

* cited by examiner

PUMP-SIGNAL COMBINER

CROSS-REFERENCE TO RELATED APPLICATION

This patent application claims priority to U.S. Provisional Patent Application No. 63/363,219, filed on Apr. 19, 2022, and entitled "PUMP-SIGNAL COMBINER WITH CAPILLARY." The disclosure of the prior application is considered part of and is incorporated by reference into this patent application.

TECHNICAL FIELD

The present disclosure relates generally to a pump combiner and to a pump-signal combiner with a signal fiber disposed within a capillary.

BACKGROUND

Pump combiners are critical components of high-power fiber lasers. A pump combiner combines pump light and signal light to increase a power of the signal light.

SUMMARY

In some implementations, a pump-signal combiner includes a first capillary, a plurality of pump fibers, a second capillary, and a signal fiber, wherein the plurality of pump fibers, the second capillary, and the signal fiber are arranged in a bundle configuration, the bundle configuration is disposed within an internal portion of the first capillary, a cross-section of the bundle configuration includes an outer area, in which the plurality of pump fibers are disposed, and an inner area, in which the second capillary and the signal fiber are disposed, and the signal fiber is disposed within an internal portion of the second capillary.

In some implementations, a laser component includes a pump-signal combiner that includes: a first capillary, a plurality of pump fibers, a second capillary, and a signal fiber, wherein the plurality of pump fibers, the second capillary, and the signal fiber are arranged in a bundle configuration, the bundle configuration is disposed within an internal portion of the first capillary, a cross-section of the bundle configuration includes an outer area, in which the plurality of pump fibers are disposed, and an inner area, in which the second capillary and the signal fiber are disposed, and the signal fiber is disposed within an internal portion of the second capillary.

In some implementations, a pump-signal combiner includes a plurality of pump fibers, a capillary, and a signal fiber, wherein the plurality of pump fibers, the capillary, and the signal fiber are arranged in a bundle configuration, respective longitudinal axes of the plurality of pump fibers are parallel to a longitudinal axis of the signal fiber along the pump-signal combiner, a cross-section of the bundle configuration includes an outer area, in which the plurality of pump fibers are disposed, and an inner area, in which the capillary and the signal fiber are disposed, and the signal fiber is disposed within an internal portion of the capillary.

DETAILED DESCRIPTION

Figure 1A:
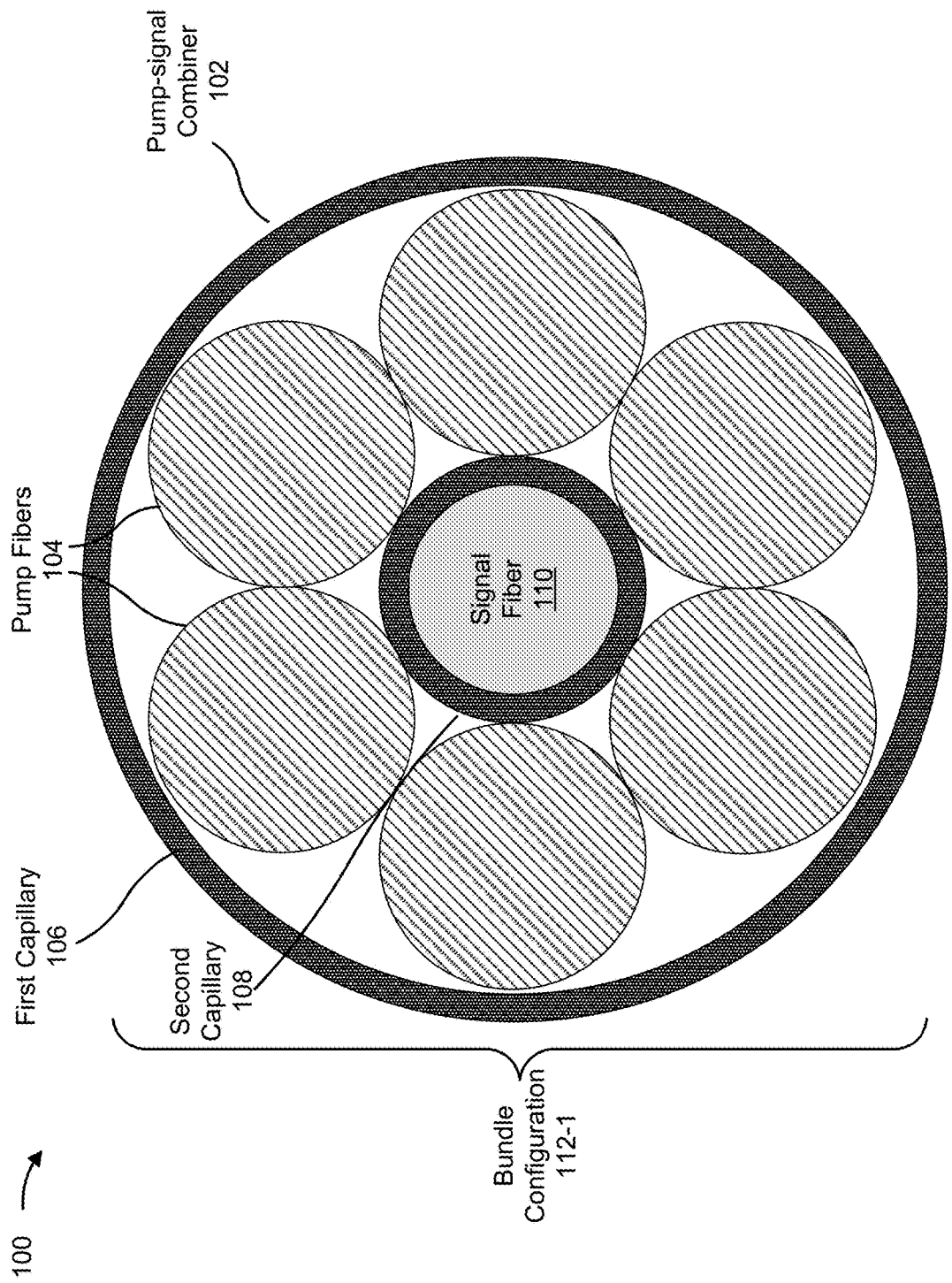
FIGS. 1A-1D are diagrams of an example implementation described herein.

The following detailed description of example implementations refers to the accompanying drawings. The same reference numbers in different drawings may identify the same or similar elements.

Pump combiners are critical components of high-power fiber lasers. In many cases, pump combiners are arranged in a bundle configuration, which is spliced to another optical structure (e.g., a master oscillator power amplifier (MOPA)/single pass fiber laser structure) that is configured to deliver many hundreds of watts (W)/kilowatts (kW) of pump power. A bundle configuration can be achieved by arranging pump fibers into a particular close-packing configuration (e.g., a hexagonal close-packing configuration, or the like), and fusing and tapering individual pump fibers into a bundle of a target size.

In some cases, a signal fiber is included, with the individual pump fibers, in the bundle. Consequently, performing a fusing and tapering process on the bundle (e.g., to fuse and taper the pump fibers), fuses the signal fiber to the pump fibers and also tapers the signal fiber. This often results in a signal fiber that is significantly reduced in size (e.g., from one end of the bundle to another end of the bundle), which can result in perturbance, or other distortion, of a signal beam that propagates through the signal fiber (e.g., end-to-end of the bundle). This reduces brightness and/or increases optical loss of the signal beam, which generates heat within the pump combiner. Further, the pump fibers are typically arranged in a "twisted" or "winding" configuration around the signal fiber (e.g., to increase a structural integrity of the bundle), which increases an amount of skew associated with pump light propagated by the pump fibers to the signal fiber and thereby decreases absorption of the pump light in the signal fiber. This further reduces brightness and/or an optical power of the signal beam. Accordingly, a performance (e.g., an optical performance and/or a thermal performance) of the pump combiner is impacted.

Some implementations described herein provide a pump-signal combiner that includes a plurality of pump fibers, a first capillary, a second capillary, and a signal fiber (e.g., disposed within the second capillary). The plurality of pump fibers, the second capillary, and the signal fiber are arranged in a bundle configuration and are disposed within the first capillary. The signal fiber may be configured to have a particular size and/or to have a particular taper (e.g., that is independent of the size and/or tapers of the plurality of pump fibers). In this way, the signal fiber is configured to reduce a likelihood of perturbance, or other distortion, of a signal beam that propagates through the signal fiber. This increases brightness and/or decreases optical loss of the signal beam and thereby reduces generation of heat within the pump-signal combiner. Further, the plurality of pump fibers may be arranged in a "straight" arrangement, not a "twisted" or "winding" arrangement, along the pump-signal combiner (e.g., because the first capillary holds the plurality of pump fibers in the straight arrangement). This reduces an amount of skew associated with pump light propagated by the plurality of pump fibers, which increases the absorption rate of the pump light in the signal fiber and thereby increases a power (e.g., an optical power) of a signal beam that propagates in, and emits from, the signal fiber, and/or reduces the length of active fiber required, reducing cost and/or improving suppression of undesired nonlinear effects. Accordingly, a performance (e.g., an optical performance and/or a thermal performance) of the pump-signal combiner is improved in comparison to a pump combiner that does not include a plurality of pump fibers, a first capillary, a second capillary, and a signal fiber as described herein.

FIGS. 1A-1D are diagrams of an example implementation 100 described herein. As shown in FIGS. 1A-1D, the example implementation 100 may include a pump-signal combiner 102. The pump-signal combiner 102 may include a plurality of pump fibers 104, a first capillary 106, a second capillary 108, and a signal fiber 110.

The signal fiber 110 may be configured to propagate a signal beam (e.g., from an input end of the pump-signal combiner 102 to an output end of the pump-signal combiner 102). The signal beam may be emitted by a signal light source (e.g., a laser light source, not shown) and may propagate to the pump-signal combiner 102 via an input signal fiber of an input component (e.g., an input component 202 described herein in relation to FIGS. 2A-2C).

The plurality of pump fibers 104 may be configured to propagate pump light (e.g., to the signal fiber 110), such that the pump light is to combine with the signal beam (e.g., within the signal fiber 110 and/or the pump-signal combiner 102) to increase a power (e.g., an optical power) of the signal beam. Portions of the pump light may be respectively emitted by a plurality of pump light sources (e.g., a plurality of laser light sources, not shown) and may respectively propagate via the plurality of pump fibers 104 to combine with the signal beam. The signal beam (e.g., after combining with the pump light) may emit from the signal fiber 110 and/or the pump-signal combiner 102 to propagate to an output signal fiber of an output component (e.g., an output component 206 described herein in relation to FIGS. 2A-2C).

Each of the first capillary 106 and the second capillary 108 may be a hollow, open-ended tube, such as a capillary tube (e.g., a glass capillary tube). Accordingly, an internal portion of each capillary (e.g., the first capillary 106 and the second capillary 108) may be defined by a space within the capillary, such as a space between internal surfaces of one or more walls of the capillary. In some implementations, the signal fiber 110 may be disposed within the internal portion of the second capillary 108 (e.g., the signal fiber 110 may be inserted into and may fill the internal portion of the second capillary 108). Additionally, or alternatively, the plurality of pump fibers 104, the second capillary 108, and the signal fiber 110 may be disposed within the internal portion of the first capillary 106 (e.g., as further described herein).

In some implementations, the plurality of pump fibers 104, the first capillary 106, the second capillary 108, and the signal fiber 110 may each comprise glass (e.g., a silica-based glass, a quartz-based glass, a fluorinated glass, or another type of glass). In some implementations, the plurality of pump fibers 104, the first capillary 106, the second capillary 108, and the signal fiber 110 may comprise a same type of glass. In some implementations, the second capillary 108 may comprise a glass that is different than the glass of the plurality of pump fibers 104 and/or the signal fiber 110.

Each of the signal fiber 110 and the plurality of pump fibers 104 may include a fiber cladding and/or a fiber core. For example, a fiber, of the signal fiber 110 and/or the plurality of pump fibers 104, may include a fiber core that is circumferentially surrounded by a fiber cladding. In some implementations, the signal fiber 110 may not have a fiber cladding (e.g., the signal fiber 110 may comprise only a fiber core), or may have a fiber cladding with a fiber cladding thickness that is different than respective fiber cladding thicknesses of fiber claddings of the plurality of pump fibers 104. For example, the signal fiber 110 may have a fiber cladding with a fiber cladding thickness that is less than respective fiber cladding thicknesses of fiber claddings of the plurality of pump fibers 104.

Figure 1B:
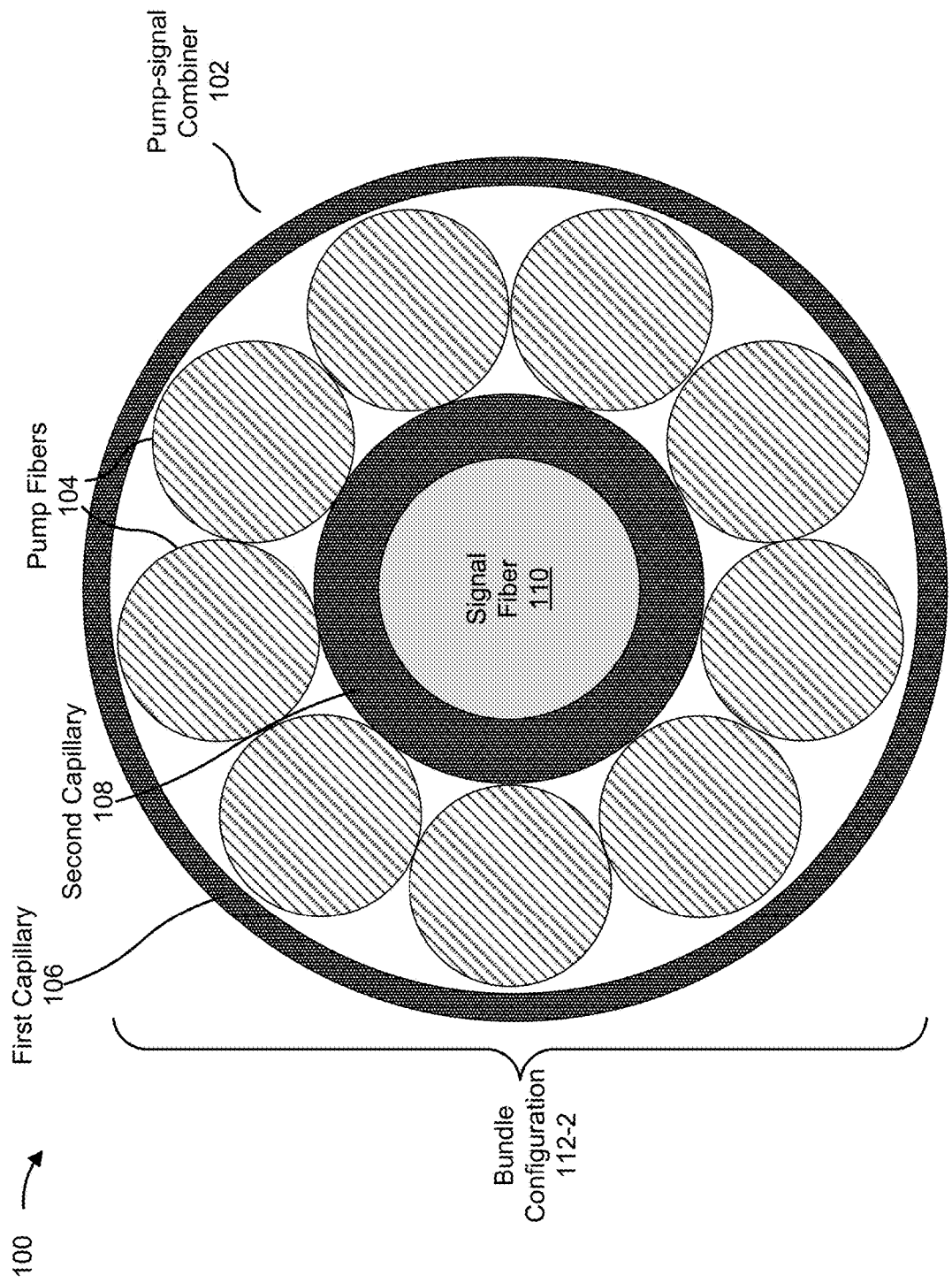
Figure 1C:
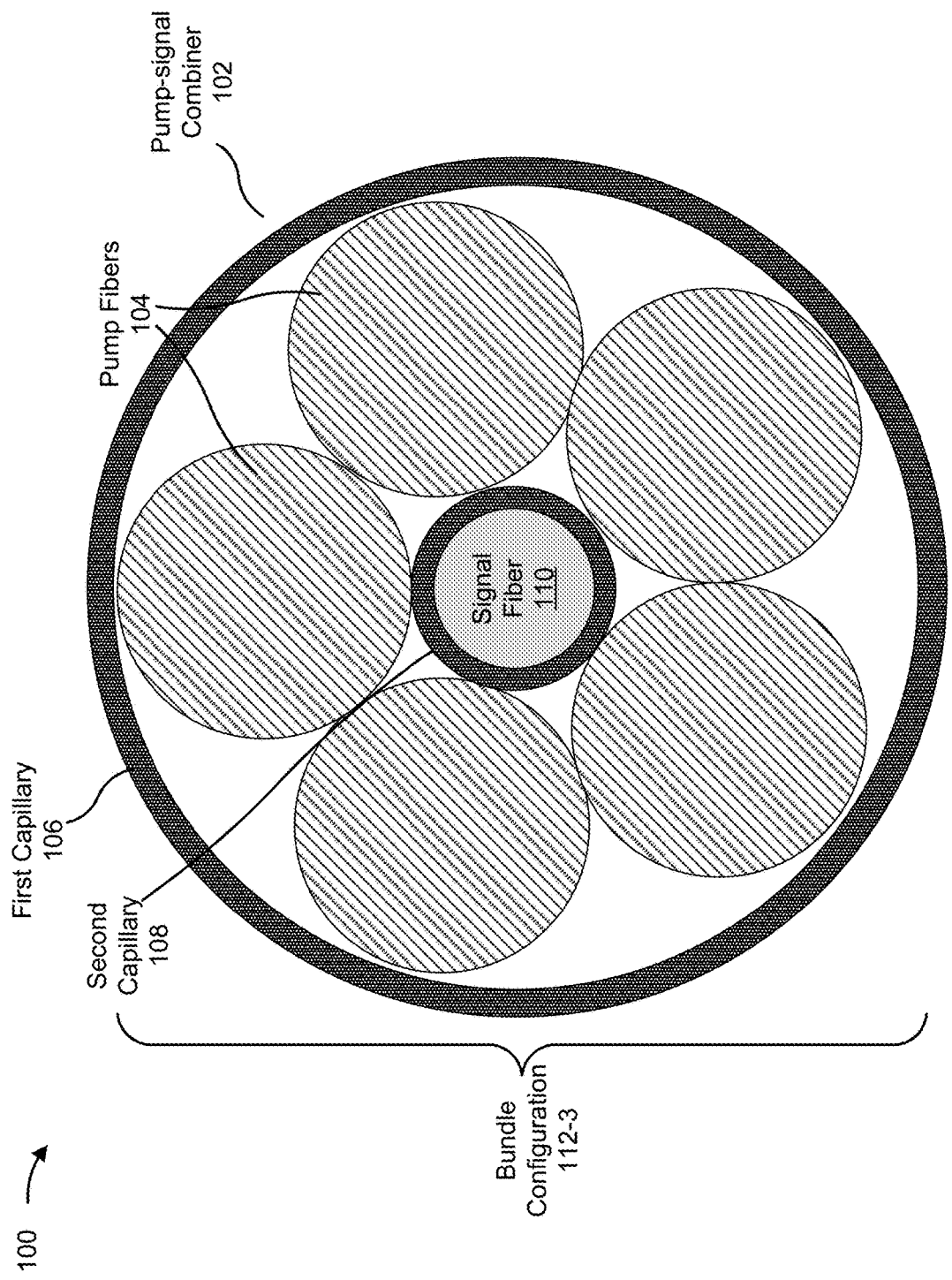

In some implementations, the plurality of pump fibers 104, the second capillary 108, and the signal fiber 110 may be arranged, within the first capillary 106, in a bundle configuration. FIGS. 1A-1C show cross-sections of examples of bundle configurations 112 (shown as bundle configurations 112-1, 112-2, and 112-3) of the plurality of pump fibers 104, the second capillary 108, and the signal fiber 110 (e.g., disposed within the internal portion of the first capillary 106).

As further shown in FIGS. 1A-1C, the plurality of pump fibers 104 may be disposed in an outer area (e.g., of the cross-section of the bundle configuration 112) and the second capillary 108 and the signal fiber 110 may be disposed in an inner area (e.g., of the cross-section of the bundle configuration 112). For example, the plurality of pump fibers 104 may be disposed in association with a perimeter region of the cross-section of the bundle configuration 112 (e.g., within the internal portion of the first capillary 106), and the second capillary 108 and the signal fiber 110 may be disposed in association with a central region of the bundle configuration 112 (e.g., with the signal fiber 110 disposed within the internal portion of the second capillary 108). Accordingly, the plurality of pump fibers 104 may circumferentially surround the second capillary 108, and the second capillary 108 may circumferentially surround the signal fiber 110.

In some implementations, the plurality of pump fibers 104, the first capillary 106, the second capillary 108, and/or the signal fiber 110 may be fused together. For example, the plurality of pump fibers 104, the second capillary 108, and the signal fiber 110 may be fused together in the bundle configuration 112 to form a single component (e.g., a unified component). Additionally, the plurality of pump fibers 104, the first capillary 106, the second capillary 108, and the signal fiber 110 may be fused together to form a single component.

Each pump fiber 104, of the plurality of pump fibers 104, has a pump fiber size (e.g., a thickness, an outer diameter, an inner diameter, or another size measurement of the pump fiber 104). In some implementations, the respective pump fiber sizes of the plurality of pump fibers 104 may match each other (e.g., may be equal to each other, within a tolerance, which may be less than or equal to 1 micrometer (μm), 2 μm, and/or 5 μm, among other examples). In some implementations, the pump fiber sizes of the plurality of pump fibers 104 may be within a pump fiber size range (e.g., greater than or equal to a minimum pump fiber size and less than or equal to a maximum pump fiber size), such as 100-250 μm, 150-200 μm, or another pump fiber size range.

The second capillary 108 has a capillary size (e.g., a thickness, an outer diameter, an inner diameter, or another size measurement of the second capillary 108). In some implementations, the second capillary 108 may have a capillary size that is within the pump fiber size range. For example, the second capillary 108 may have a capillary size that matches (e.g., may be equal to, within the tolerance described above) at least one of the pump fiber sizes of the plurality of pump fibers 104 (e.g., the second capillary 108 is a same size of at least one of the plurality of pump fibers 104), such as shown in FIG. 1A. In some implementations, the second capillary 108 may have a capillary size that is greater than a maximum pump fiber size of the pump fiber size range (e.g., the second capillary 108 is larger than each of the plurality of pump fibers 104), such as shown in FIG. 1B. In some implementations, the second capillary 108 may have a capillary size that is less than a minimum pump fiber size of the pump fiber size range (e.g., the second capillary 108 is smaller than each of the plurality of pump fibers 104), such as shown in FIG. 1C.

The one or more walls of the second capillary 108 may have a wall thickness. For example, the wall thickness may be a difference between an outer diameter and an inner diameter of the second capillary 108. In some implementations, the wall thickness may be less than or equal to a wall thickness threshold, which may greater than or equal to 10 µm and less than or equal to 100 µm.

The signal fiber 110 has a signal fiber size (e.g., a thickness, an outer diameter, an inner diameter, or another size measurement of the signal fiber 110). The signal fiber size of the signal fiber 110 may be less than the capillary size of the of the second capillary 108. For example, the signal fiber size may be less than the inner diameter of the second capillary 108 (e.g., to enable the signal fiber 110 to be disposed within the internal portion of the second capillary 108). In some implementations, the signal fiber 110 may have a signal fiber size that is within the pump fiber size range (not shown), that is greater than a maximum pump fiber size of the pump fiber size range (e.g., as shown in FIG. 1B), or that is less than a minimum pump fiber size of the pump fiber size range (e.g., as shown in FIGS. 1A and 1C).

The first capillary 106 has a capillary size (e.g., a thickness, an outer diameter, an inner diameter, or another size measurement of the first capillary 106). In some implementations, the first capillary 106 has a capillary size that is greater than a size (e.g., a thickness, an outer diameter, an inner diameter, or another size measurement) of the bundle configuration 112. For example, the size of the bundle configuration 112 may be less than the inner diameter of the first capillary 106 (e.g., to enable the bundle configuration 112 to be disposed within the internal portion of the first capillary 106). The one or more walls of the first capillary 106 may have a wall thickness. For example, the wall thickness may be a difference between an outer diameter and an inner diameter of the first capillary 106. In some implementations, the wall thickness may be less than or equal to a wall thickness threshold, which may greater than or equal to 10 µm and less than or equal to 200 µm.

Figure 1D:
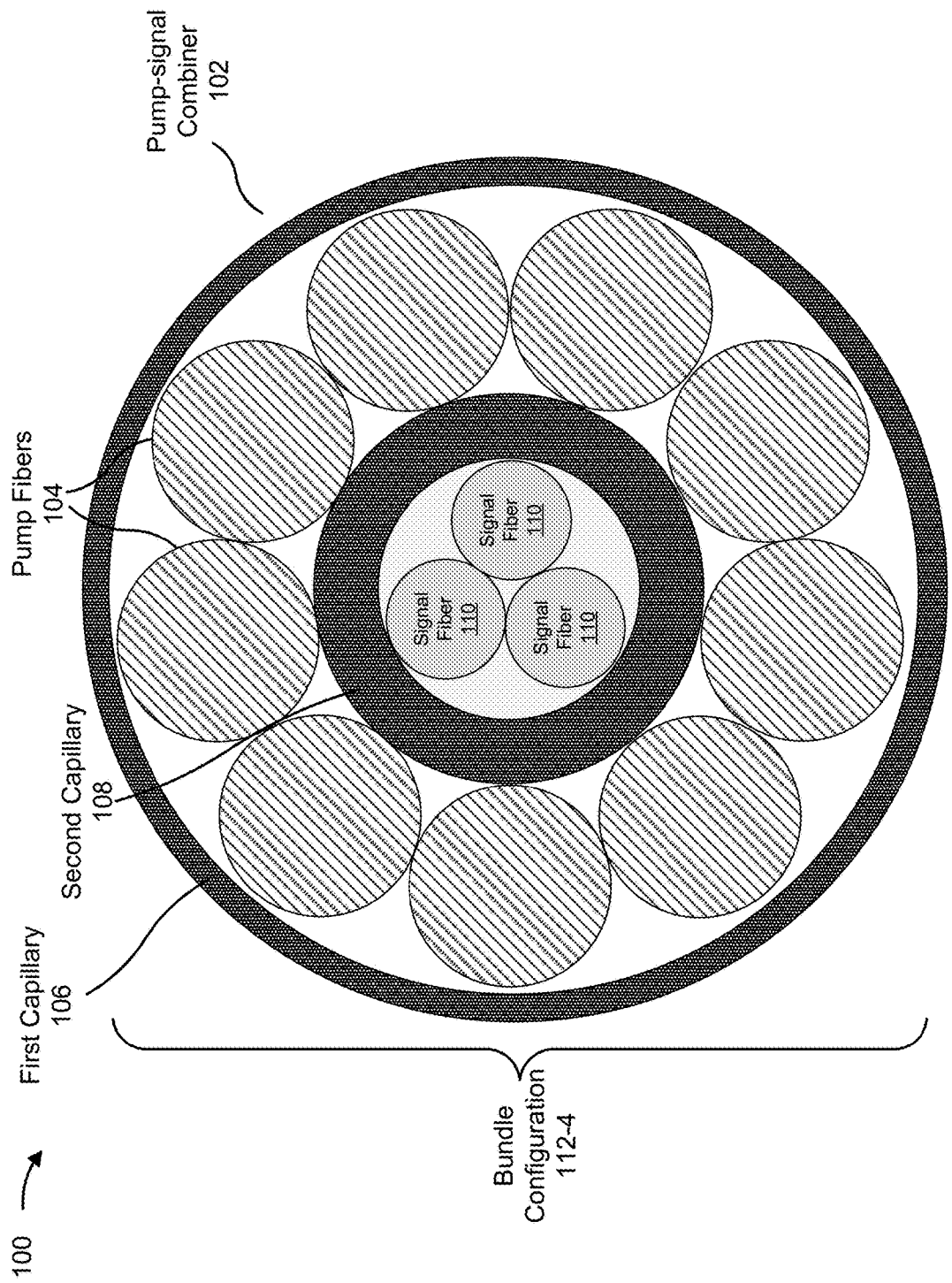

In some implementations, the pump-signal combiner 102 may include multiple signal fibers 110 (e.g., instead of only one signal fiber 110). For example, FIG. 1D shows a cross-section of a plurality of pump fibers 104, a second capillary 108, and a plurality of signal fibers 110 arranged in a bundle configuration 112-4 (e.g., within the internal portion of the first capillary 106). The plurality of signal fibers 110 may be disposed within an internal portion of the second capillary 108. As further shown in FIG. 1D, the plurality of pump fibers 104 may be disposed in an outer area (e.g., of the cross-section of the bundle configuration 112-4), and the second capillary 108 and the plurality of signals fiber 110 may be disposed in an inner area (e.g., of the cross-section of the bundle configuration 112-4).

FIGS. 1A-1D are provided as an example. Other examples may differ from what is described with regard to FIGS. 1A-1D.

Figure 2A:
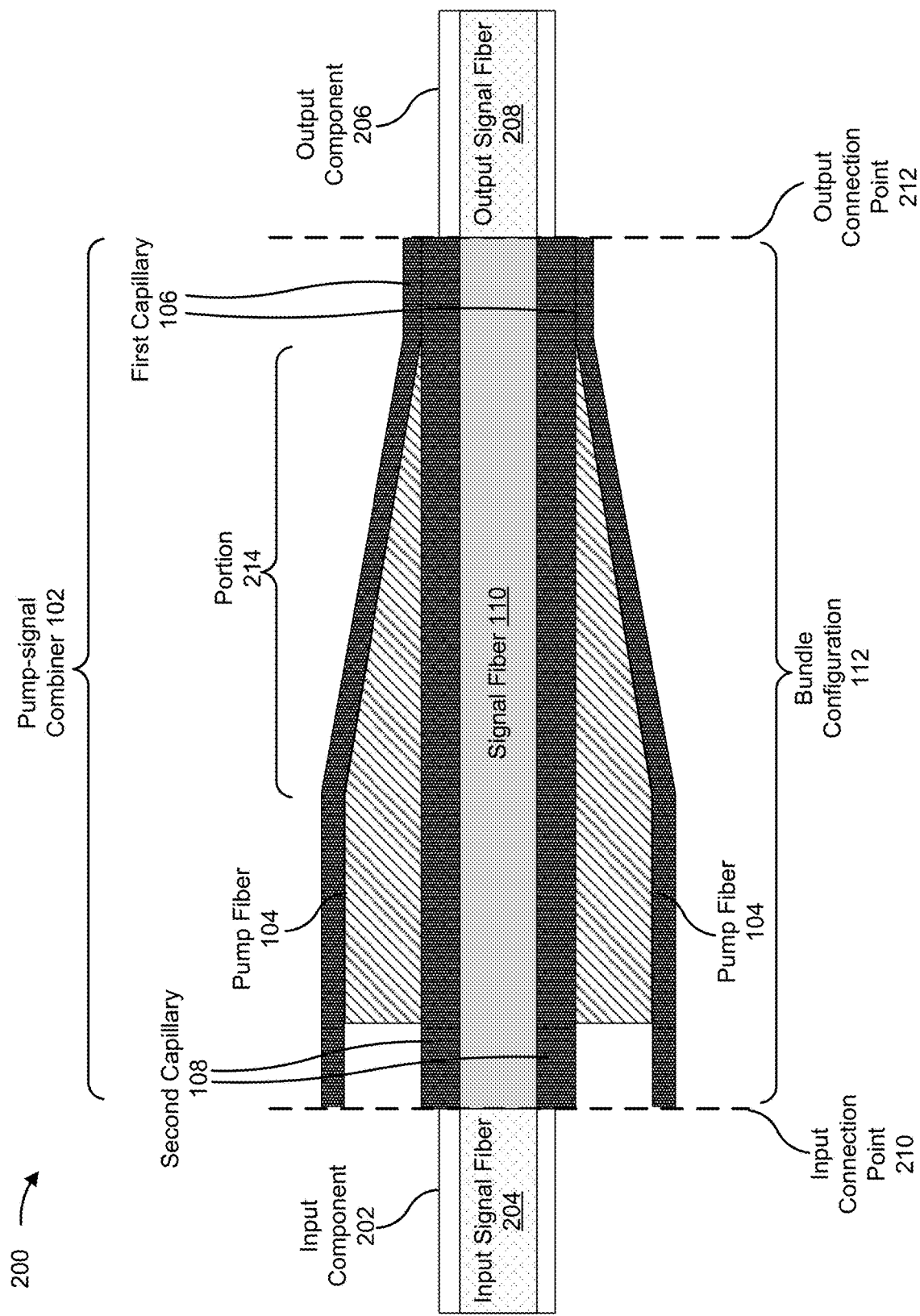
FIGS. 2A-2C are diagrams of an example laser component described herein.
Figure 2B:
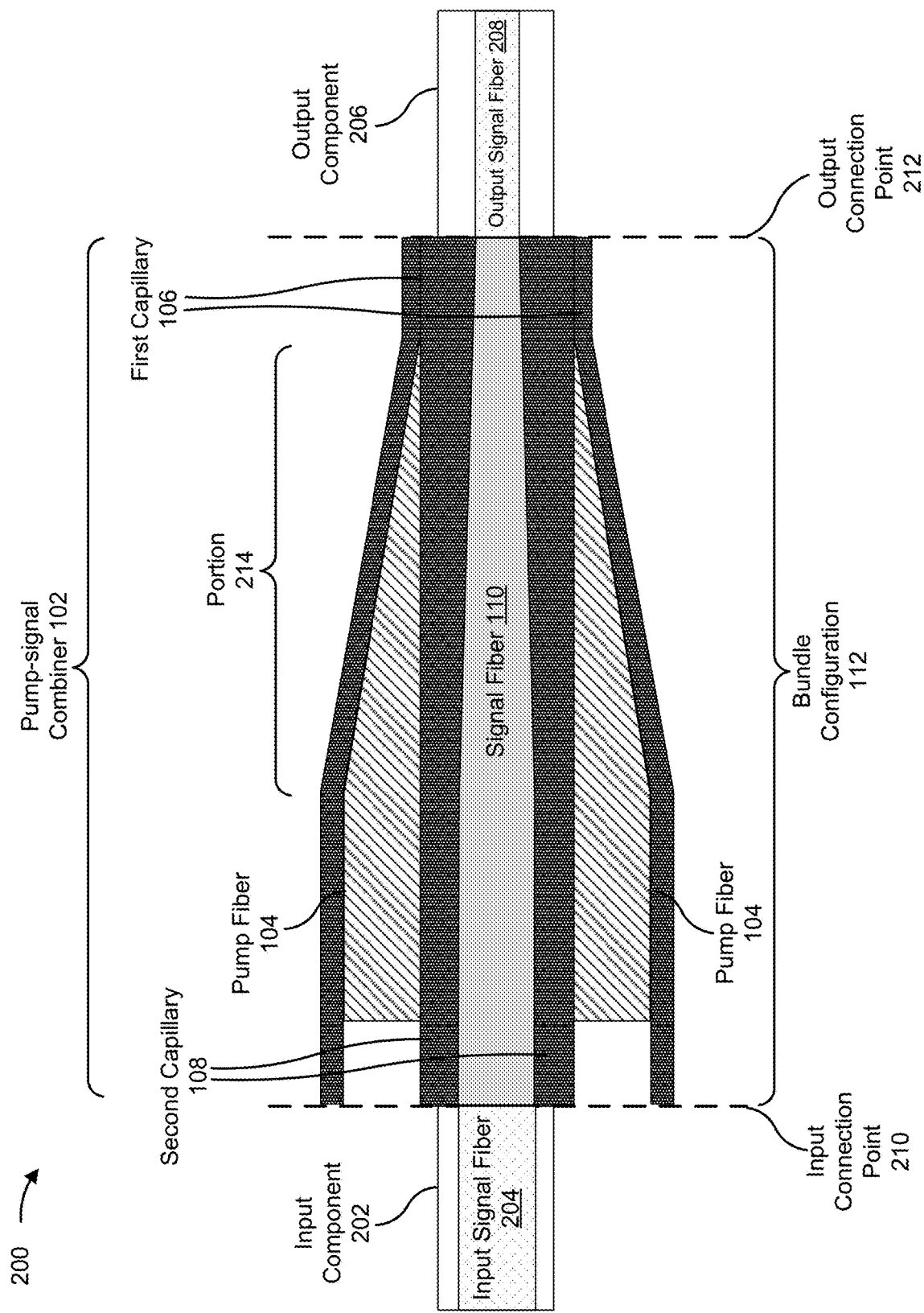
Figure 2C:
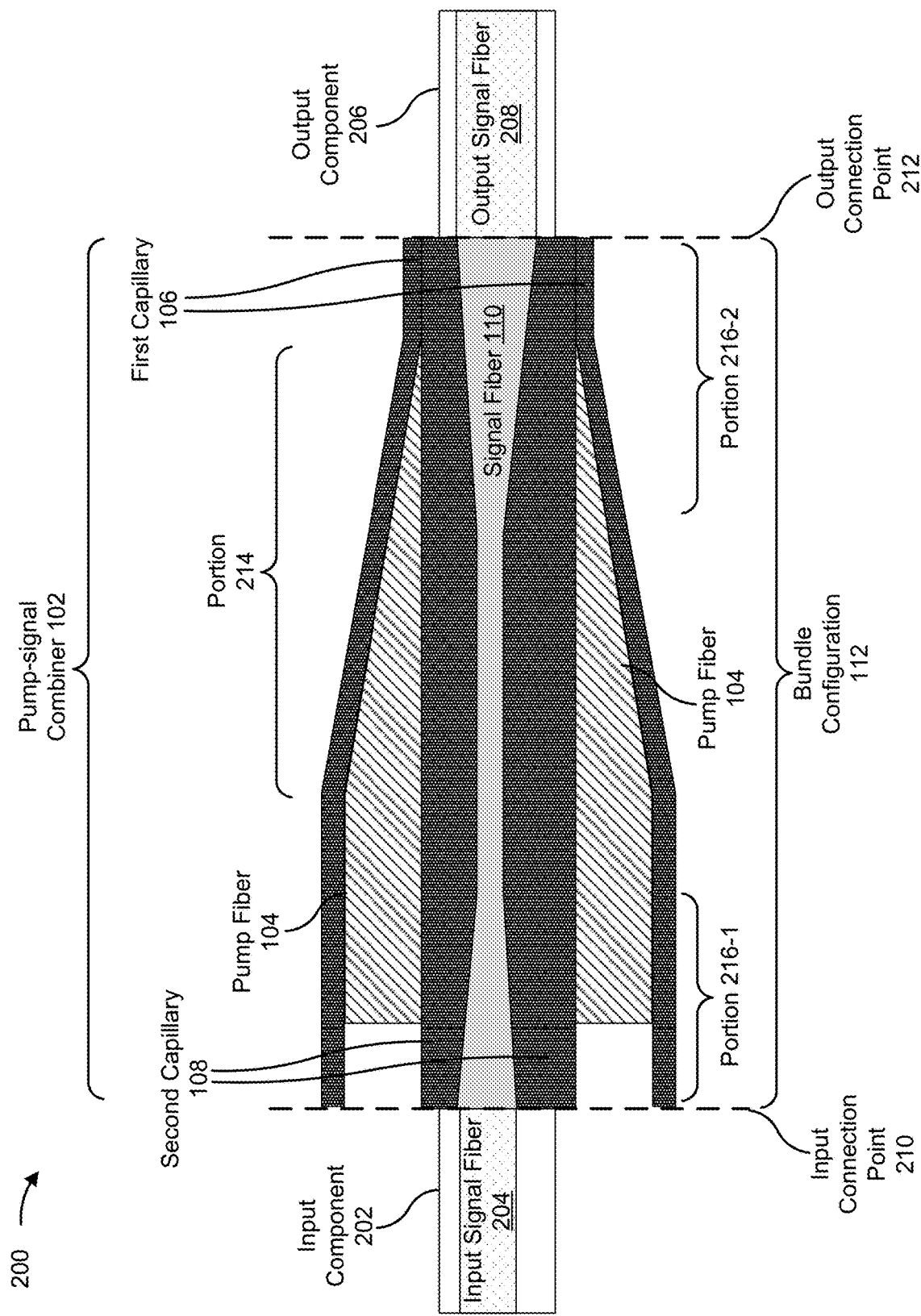

FIGS. 2A-2C are diagrams of an example laser component 200 (e.g., of a laser system) described herein. As shown in FIGS. 2A-2C, the laser component 200 may include a pump-signal combiner 102, which may include a plurality of pump fibers 104, a first capillary 106, a second capillary 108, and a signal fiber 110 (e.g., as described herein in relation to FIGS. 1A-1D). As further shown in FIGS. 2A-2C, the laser component 200 may include an input component 202 that includes an input signal fiber 204 and/or and output component 206 that includes an output signal fiber 208.

The input component 202 may be an oscillator, an amplifier, a mode field adapter (MFA), or another optical component that includes the input signal fiber 204. The input signal fiber 204 may be configured to propagate a signal beam (e.g., that is emitted by a signal light source, such as a laser light source, not shown) to the signal fiber 110 (e.g., to an input end of the signal fiber 110). Accordingly, the input signal fiber 204 may be connected to the input end of the signal fiber 110 (e.g., the input signal fiber 204 may be spliced, or otherwise connected, to the input end of the signal fiber 110). For example, as shown in FIGS. 2A-2C, the input signal fiber 204 may be connected to the input end of the signal fiber 110 at an input connection point 210. In some implementations, the input signal fiber 204 may include a fiber cladding and/or a fiber core. Accordingly, the input signal fiber 204 may be connected to the input end of the signal fiber 110 such that a fiber core of the input signal fiber 204 is aligned with a fiber core of the signal fiber 110.

The input signal fiber 204 has an input signal fiber size (e.g., a thickness, an outer diameter, an inner diameter, or another size measurement of the input signal fiber 204) at the input connection point 210. In some implementations, the input signal fiber size of the input signal fiber 204 may match the signal fiber size of the signal fiber 110 at the input connection point 210 (e.g., may match the signal fiber size of the signal fiber 110 at the input end of the signal fiber 110). For example, a difference between the input signal fiber size and the signal fiber size may satisfy (e.g., be less than or equal to) a size threshold, which may be less than or equal to, for example, 10 µm, 15, µm, and/or 25 µm. This facilitates accurate alignment of the fiber core of the input signal fiber 204 and the fiber core of the signal fiber 110 when the input signal fiber 204 is connected to the input end of the signal fiber 110 at the input connection point 210.

The output component 206 may be an oscillator, an amplifier, an MFA, or another optical component that includes the output signal fiber 208. The output signal fiber 208 may be configured to receive and propagate a signal beam (e.g., that is propagated by the signal fiber 110 within the pump-signal combiner 102) from an output end of the signal fiber 110. Accordingly, the output signal fiber 208 may be connected to the output end of the signal fiber 110 (e.g., the output signal fiber 208 may be spliced, or otherwise connected, to the output end of the signal fiber 110). For example, as shown in FIGS. 2A-2C, the output signal fiber 208 may be connected to the output end of the signal fiber 110 at an output connection point 212. In some implementations, the output signal fiber 208 may include a fiber cladding and/or a fiber core. Accordingly, the output signal fiber 208 may be connected to the output end of the signal fiber 110 such that a fiber core of the output signal fiber 208 is aligned with a fiber core of the signal fiber 110.

The output signal fiber 208 has an output signal fiber size (e.g., a thickness, an outer diameter, an inner diameter, or another size measurement of output signal fiber 208) at the output connection point 212. In some implementations, the output signal fiber size of the output signal fiber 208 may match the signal fiber size of the signal fiber 110 at the output connection point 212 (e.g., may match the signal fiber size of the signal fiber 110 at the output end of the signal fiber 110). For example, a difference between the output signal fiber size and the signal fiber size may satisfy (e.g., be less than or equal to) a size threshold, which may be less than or equal to, for example, 1 μm, 2 μm, and/or 5 μm. This facilitates accurate alignment of the fiber core of the output signal fiber 208 and the fiber core of the signal fiber 110 when the output signal fiber 208 is connected to the output end of the signal fiber 110 at the output connection point 212.

As shown in FIGS. 2A-2C, the plurality of pump fibers 104 may be tapered along a portion 214 of the pump-signal combiner 102. For example, the plurality of pump fibers 104 may be tapered along the portion 214 of the pump-signal combiner 102 in association with a first taper ratio (e.g., a 2:1, a 3:1, a 3.75:1, or a 5.2:1 taper ratio, among other examples). In some implementations, the signal fiber 110 may not be tapered along the portion 214 of the pump-signal combiner 102, such as shown in FIG. 2A. In some implementations, the signal fiber 110 may be tapered along the portion 214 of the pump-signal combiner 102 in association with a second taper ratio (e.g., that is different than the first taper ratio, such as a second taper ratio that is greater than the first taper ratio or less than the first taper ratio), such as shown in FIG. 2B.

As shown in FIG. 2C, the signal fiber 110 may be tapered along multiple portions 216 (shown as portions 216-1 and 216-2) of the pump-signal combiner 102. For example, the signal fiber 110 may be tapered along the portion 216-1 of the pump-signal combiner 102 in association with a first taper ratio, and may be tapered along the portion 216-2 of the pump-signal combiner 102 in association with a second taper ratio (e.g., that is the same as, or different than, the first taper ratio). In this way, in some implementations, the signal fiber 110 may have a "taper" adjacent to one end of the signal fiber 110 and a "counter-taper" adjacent to another end of the signal fiber 110.

Accordingly, in some implementations, the signal fiber 110 may have a first signal fiber size (e.g., a first thickness, a first outer diameter, a first inner diameter, or another size measurement of the signal fiber 110) at an input end of the signal fiber 110 (e.g., at the input connection point 210), and may have a second signal fiber size (e.g., a second thickness, a second outer diameter, a second inner diameter, or another size measurement of the signal fiber 110) at an output end of the signal fiber 110 (e.g., at the output connection point 212). The first signal fiber size and the second signal fiber size may not match (e.g., may be different, such that the first signal fiber size and the second signal fiber are not equal to each other, even within a tolerance, which may be less than or equal to, for example, 10 μm, 15, μm, and/or 25 μm). Additionally, or alternatively, the signal fiber 110 may have a third signal fiber size (e.g., a first thickness, a first outer diameter, a first inner diameter, or another size measurement of the signal fiber 110) at a different point along the signal fiber 110 (e.g., that is not the input end and that is not the output end of the signal fiber 110). The third signal fiber size may not match the first signal fiber size and/or may not match the second signal fiber size.

FIGS. 2A-2C are provided as an example. Other examples may differ from what is described with regard to FIGS. 2A-2C.

Figure 3:
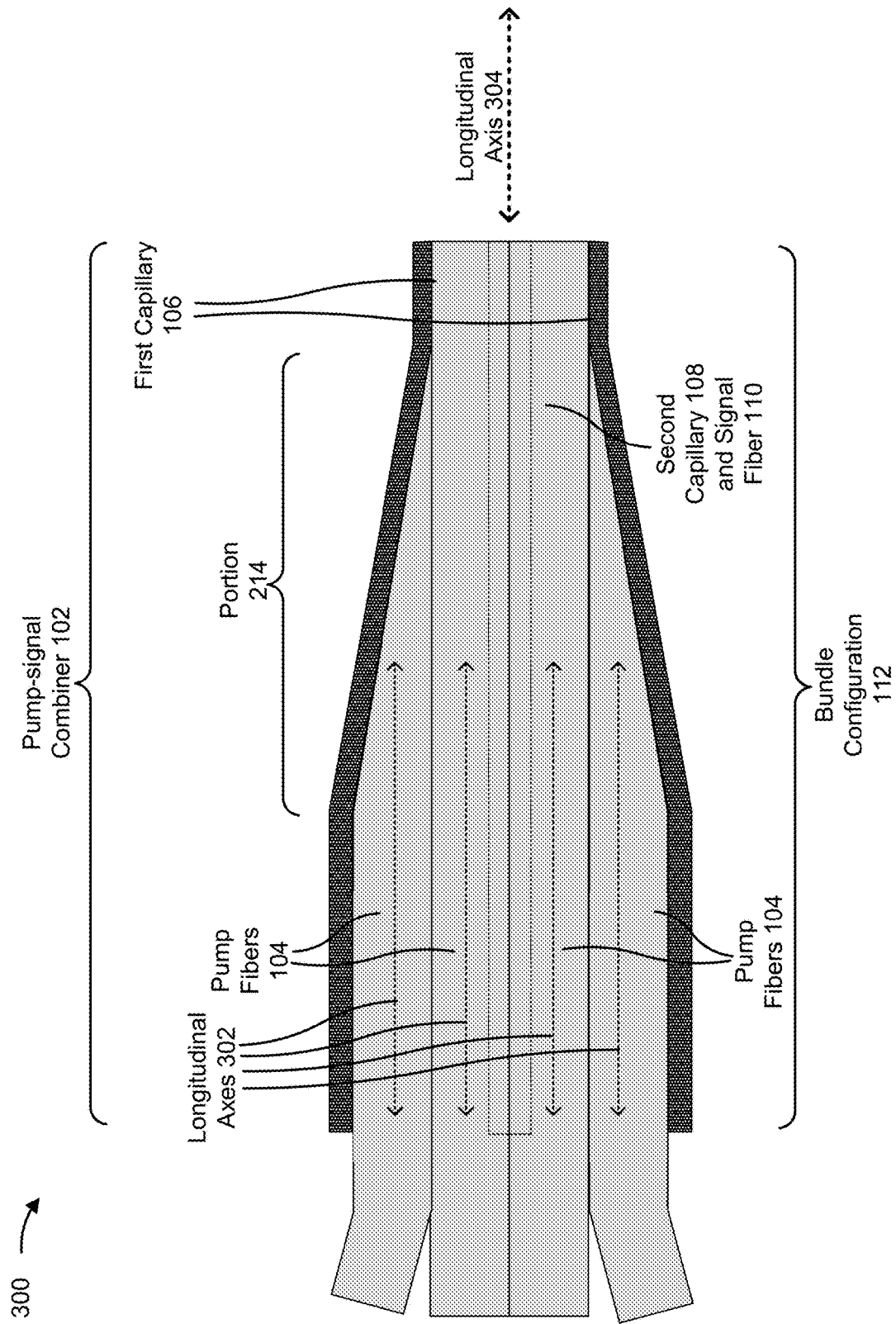
FIG. 3 is a diagram of an example laser component described herein.

FIG. 3 is a diagram of an example laser component 300 described herein. As shown in FIG. 3, the laser component 300 may include a pump-signal combiner 102, which may include a plurality of pump fibers 104, a first capillary 106, a second capillary 108, and a signal fiber 110 (e.g., as described herein in relation to FIGS. 1A-1D and 2A-2C). As further shown in FIG. 3, the plurality of pump fibers 104 may be tapered along a portion 214 of the pump-signal combiner 102 (e.g., as described elsewhere herein).

In some implementations, respective longitudinal axes 302 of the plurality of pump fibers 104 may be parallel to (e.g., within a tolerance, which may be less than or equal to 1, 2, and/or 3 degrees), along the pump-signal combiner 102, at least one of a longitudinal axis of the first capillary 106, a longitudinal axis of the second capillary 108, or a longitudinal axis of the pump-signal combiner 102 (shown in FIG. 3 as representative longitudinal axis 304). Put another way, the plurality of pump fibers 104 may be arranged in a "straight" arrangement, not a "twisted" or "winding" arrangement, along the pump-signal combiner 102 (e.g., because the first capillary 106 holds the plurality of pump fibers 104 in the straight arrangement). This reduces an amount of skew associated with pump light propagated by the plurality of pump fibers 104, which increases absorption of the pump light in the signal fiber 110 and thereby increases a power (e.g., an optical power) of a signal beam that propagates in, and emits from, the signal fiber 110.

FIG. 3 is provided as an example. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A pump-signal combiner, comprising:
   a first capillary;
   a plurality of pump fibers;
   a second capillary; and
   a signal fiber, wherein:
      the plurality of pump fibers, the second capillary, and the signal fiber are arranged in a bundle configuration,
      the bundle configuration is disposed within an internal portion of the first capillary,
      a cross-section of the bundle configuration includes an outer area, in which the plurality of pump fibers are disposed, and an inner area, in which the second capillary and the signal fiber are disposed,
      the signal fiber is disposed within an internal portion of the second capillary,
      the signal fiber is tapered along a first portion of the pump-signal combiner in association with a first taper ratio,
      the signal fiber is tapered along a second portion of the pump-signal combiner in association with a second taper ratio,
      the first taper ratio is different than the second taper ratio, and
      an outer diameter of the second capillary is constant along the first portion and the second portion.

2. The pump-signal combiner of claim 1, wherein respective longitudinal axes of the plurality of pump fibers are parallel to a longitudinal axis of the first capillary along the pump-signal combiner.

3. The pump-signal combiner of claim 1, wherein the first capillary, the plurality of pump fibers, the second capillary, and the signal fiber are fused together to form a single component.

4. The pump-signal combiner of claim 1, wherein:
   the plurality of pump fibers are tapered along the first portion of the pump-signal combiner in association with a third taper ratio; and
   the first taper ratio is different than the third taper ratio.

5. The pump-signal combiner of claim 1, wherein:
   the signal fiber has a first outer diameter at an input end of the signal fiber;
   the signal fiber has a second outer diameter at an output end of the signal fiber; and
   the first outer diameter and the second outer diameter are different.

6. The pump-signal combiner of claim 1, wherein, within the cross-section of the bundle configuration, the plurality of pump fibers circumferentially surround the second capillary and the second capillary circumferentially surrounds the signal fiber.

7. The pump-signal combiner of claim 1, wherein the plurality of pump fibers, the first capillary, the second capillary, and the signal fiber comprise a same type of glass.

8. The pump-signal combiner of claim 1, wherein the plurality of pump fibers each include a cladding and the signal fiber does not include a cladding.

9. The pump-signal combiner of claim 1, further comprising another signal fiber, wherein:
   the other signal fiber is arranged, with the plurality of pump fibers, the second capillary, and the signal fiber, in the bundle configuration,
   the other signal fiber is disposed in the inner area of the cross-section of the bundle configuration, and
   the other signal fiber is disposed within the internal portion of the second capillary.

10. A laser component, comprising:
    a pump-signal combiner that includes:
       a first capillary;
       a plurality of pump fibers;
       a second capillary; and
       a signal fiber, wherein:
          the plurality of pump fibers, the second capillary, and the signal fiber are arranged in a bundle configuration,
          the bundle configuration is disposed within an internal portion of the first capillary,
          a cross-section of the bundle configuration includes an outer area, in which the plurality of pump fibers are disposed, and an inner area, in which the second capillary and the signal fiber are disposed,
          the signal fiber is disposed within an internal portion of the second capillary,
          the signal fiber is tapered along a first portion of the pump-signal combiner in association with a first taper ratio,
          the signal fiber is tapered along a second portion of the pump-signal combiner in association with a second taper ratio, and
          the first taper ratio is different than the second taper ratio, and
          an outer diameter of the second capillary is constant along the first portion and the second portion.

11. The laser component of claim 10, wherein respective longitudinal axes of the plurality of pump fibers are parallel to a longitudinal axis of the second capillary along the pump-signal combiner.

12. The laser component of claim 10, wherein:
    the plurality of pump fibers are tapered along the first portion of the pump-signal combiner in association with a third taper ratio; and
    the first taper ratio is different than the third taper ratio.

13. The laser component of claim 10, further comprising an input component, wherein:
    the input component includes an input signal fiber that is connected to an input end of the signal fiber of the pump-signal combiner at a connection point;
    the input signal fiber has a first outer diameter at the connection point;
    the signal fiber has a second outer diameter at the connection point and a third outer diameter at a different point along the signal fiber;
    the first outer diameter matches the second outer diameter; and the second outer diameter and the third outer diameter do not match.

14. The laser component of claim 10, further comprising an output component, wherein:
the output component includes an output signal fiber that is connected to an output end of the signal fiber of the pump-signal combiner at a connection point;
the output signal fiber has a first outer diameter at the connection point;
the signal fiber has a second outer diameter at the connection point and a third outer diameter at a different point along the signal fiber;
the first outer diameter matches the second outer diameter; and
the second outer diameter and the third outer diameter do not match.

15. A pump-signal combiner, comprising:
a plurality of pump fibers;
a capillary; and
a signal fiber, wherein:
the plurality of pump fibers, the capillary, and the signal fiber are arranged in a bundle configuration,
respective longitudinal axes of the plurality of pump fibers are parallel to a longitudinal axis of the signal fiber along the pump-signal combiner,
a cross-section of the bundle configuration includes an outer area, in which the plurality of pump fibers are disposed, and an inner area, in which the capillary and the signal fiber are disposed,
the signal fiber is disposed within an internal portion of the capillary,
the signal fiber is tapered along a first portion of the pump-signal combiner in association with a first taper ratio,
the signal fiber is tapered along a second portion of the pump-signal combiner in association with a second taper ratio,
the first taper ratio is different than the second taper ratio, and
an outer diameter of the capillary is constant along the first portion and the second portion.

16. The pump-signal combiner of claim 15, wherein the pump-signal combiner comprises an additional capillary,
wherein the bundle configuration is disposed within an internal portion of the additional capillary.

17. The pump-signal combiner of claim 15, wherein the signal fiber is respectively tapered along one or more portions of the pump-signal combiner.

18. The pump-signal combiner of claim 15, wherein:
the plurality of pump fibers are tapered along the first portion of the pump-signal combiner in association with a third taper ratio; and
the first taper ratio is different than the third taper ratio.

19. The pump-signal combiner of claim 15, wherein the plurality of pump fibers, the capillary, and the signal fiber are fused together to form a single component.

20. The pump-signal combiner of claim 15, wherein:
the signal fiber has a first outer diameter at an input end of the signal fiber;
the signal fiber has a second outer diameter at an output end of the signal fiber; and
the first outer diameter and the second outer diameter are different.

* * * * *